United States Patent [19]

Swanson

[11] Patent Number: 5,042,836
[45] Date of Patent: Aug. 27, 1991

[54] MOTOR VEHICLE COMPARTMENT CLOSURE COVERING APPARATUS

[76] Inventor: Thomas E. Swanson, 4467 Clay St., Boulder, Colo. 80301

[21] Appl. No.: 542,805

[22] Filed: Jun. 22, 1990

Related U.S. Application Data

[63] Continuation of Ser. No. 264,254, Oct. 28, 1988, abandoned.

[51] Int. Cl.$^5$ .............................................. B60R 19/52
[52] U.S. Cl. ...................................... 280/770; 135/88; 150/166; 160/370.2; 296/136
[58] Field of Search ......................... 280/770; 180/68.6; 150/166; 296/136, 77.1; 135/87, 88, 119; 160/370.2

[56] References Cited

U.S. PATENT DOCUMENTS

| 1,528,712 | 3/1925 | Ward | 150/166 |
| 2,666,840 | 1/1954 | Poirier | 150/166 |
| 2,801,667 | 8/1957 | Curran | 150/166 |
| 4,219,218 | 8/1980 | Waldon | 280/770 |
| 4,925,234 | 5/1990 | Park et al. | 135/88 |
| 4,997,229 | 3/1991 | Swanson | 296/136 |

FOREIGN PATENT DOCUMENTS

| 229516 | 11/1959 | Australia | 150/166 |
| 2118853 | 11/1972 | Fed. Rep. of Germany | 150/166 |
| 1034045 | 7/1953 | France | 150/166 |
| 588955 | 6/1977 | Switzerland | 296/136 |
| 815798 | 7/1959 | United Kingdom | 296/136 |

OTHER PUBLICATIONS

J. C. Whitney Catalog 465B, p. 57, 12/1985.

Primary Examiner—Andres Kashnikow
Assistant Examiner—Eric Culbreth
Attorney, Agent, or Firm—Harold A. Burdick

[57] ABSTRACT

A covering apparatus is disclosed which is adaptable to cover any one of a plurality of similarly positioned motor vehicle compartment closures, for example engine compartment hoods, where such closures are of unlike size and/or shape such as would be the case on vehicles of different manufacture, model year or the like. The apparatus includes a pliable cover having preselected dimensions so that when the cover is positioned on the outwardly facing surface of the closure to be covered portions of the cover extend independently of one another substantially beyond the edges of the closure. Each of the portions of the cover are configured to engage an elastic cord with the cord being interconnectable adjacent to the inwardly facing surface of the closure so that, when the cord is interconnected, the portions of the cover are urged around the edges of the closure and positioned adjacent to the inwardly facing surface thereof to thus maintain the cover on the closure and in close conformity to the contours of the outwardly facing surface of the closure covered thereby.

19 Claims, 2 Drawing Sheets

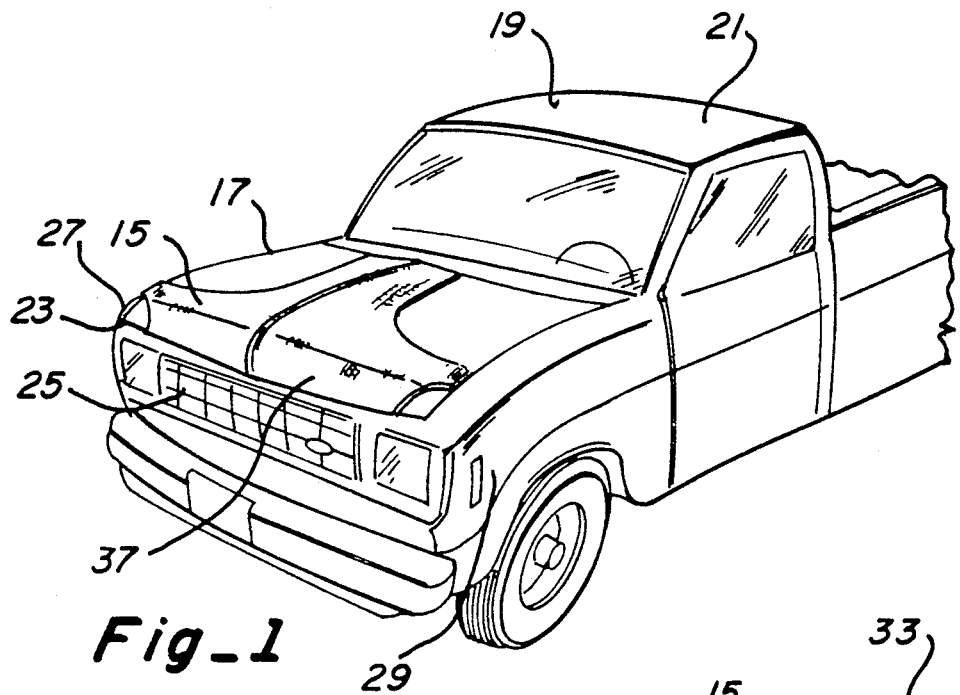
Fig_1
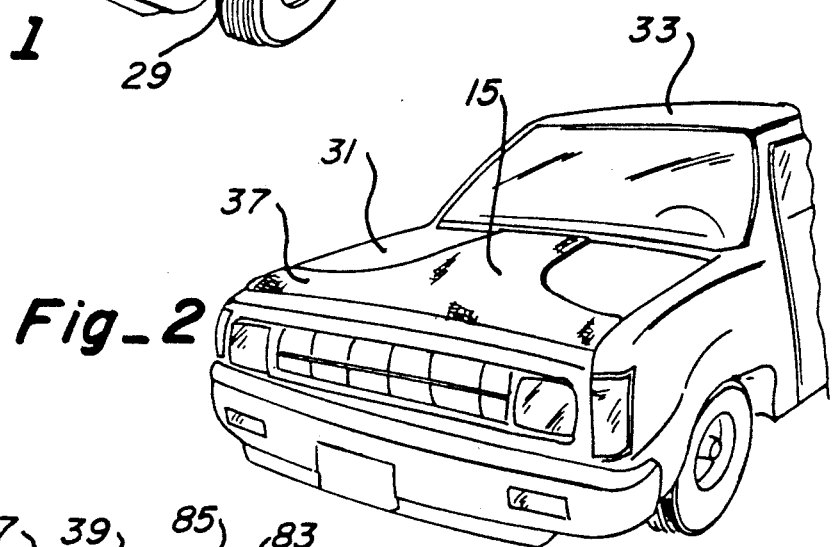
Fig_2
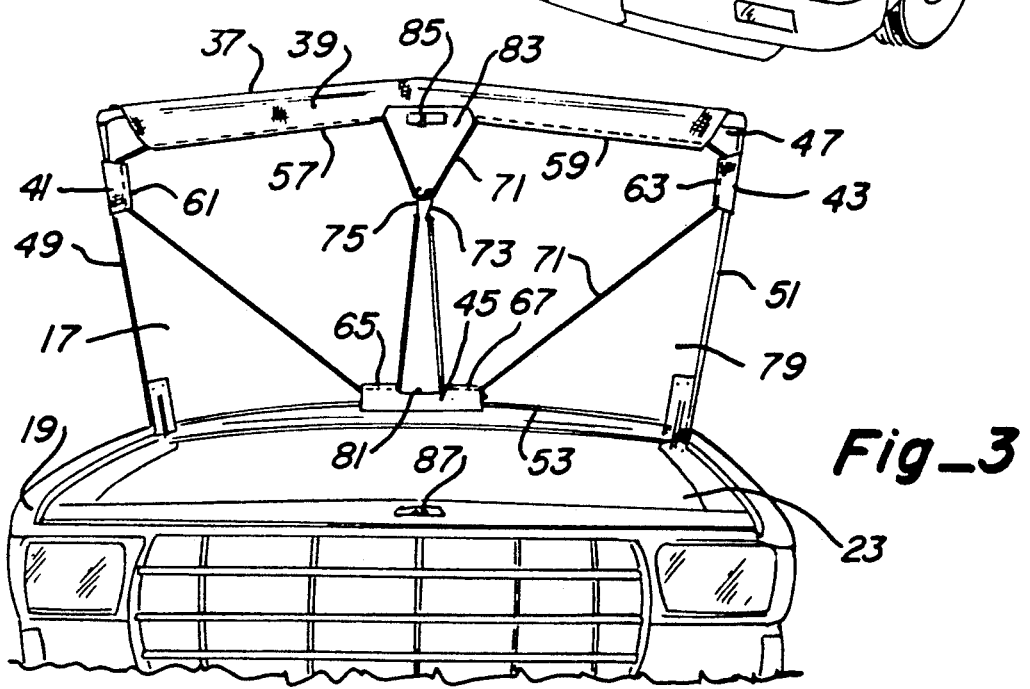
Fig_3

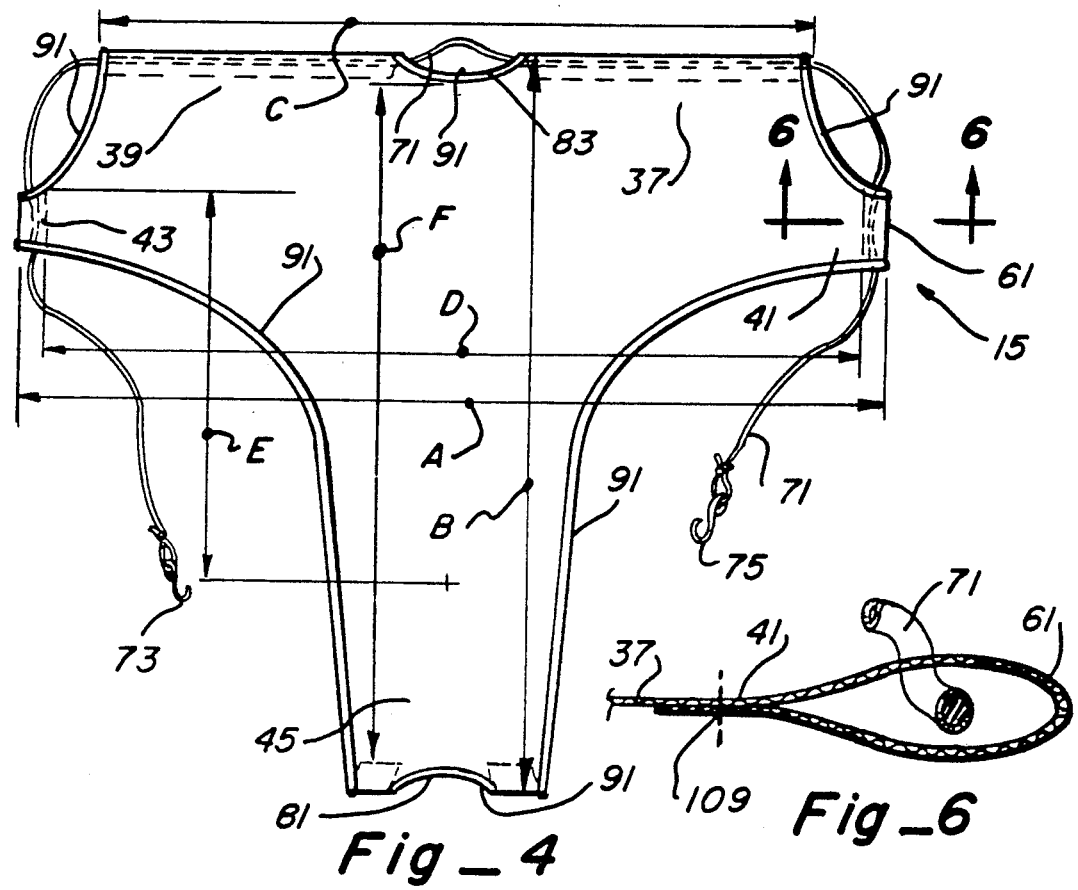
Fig_4
Fig_6
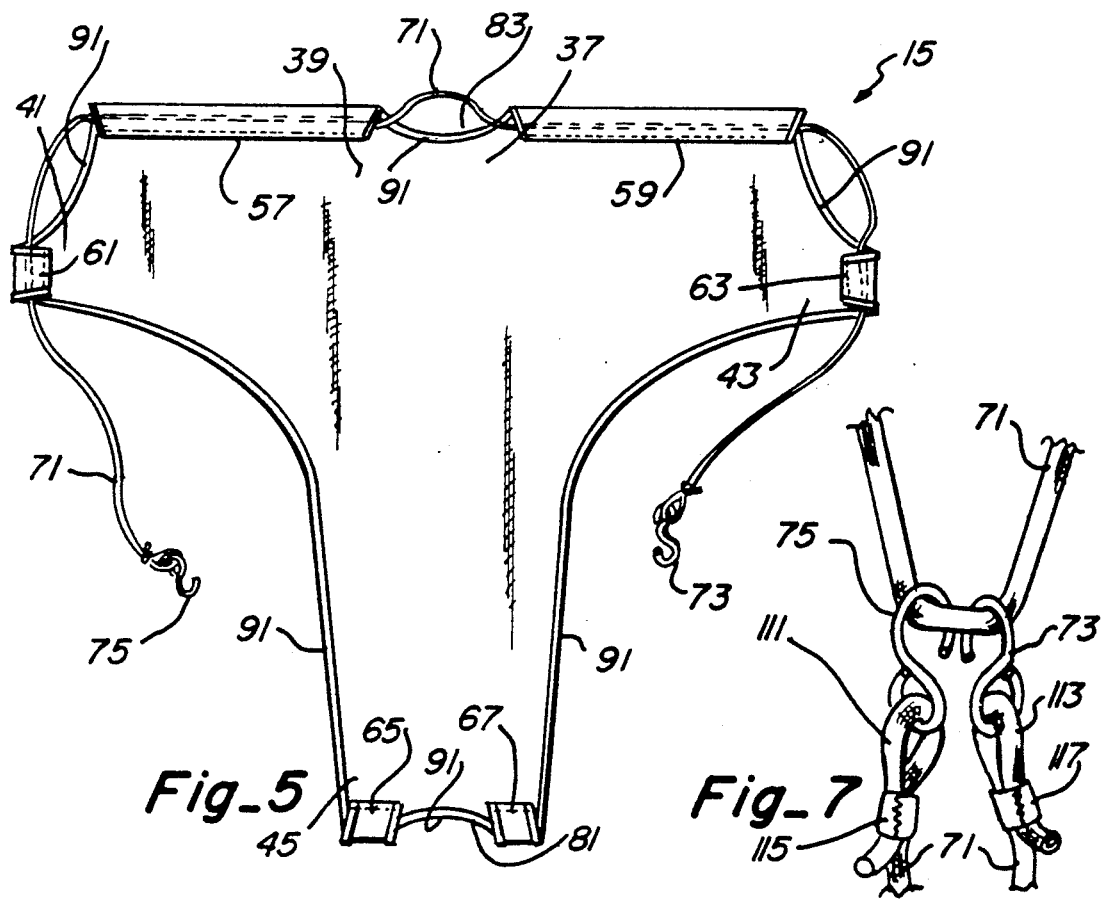
Fig_5
Fig_7

MOTOR VEHICLE COMPARTMENT CLOSURE COVERING APPARATUS

This application is a continuation of U.S. application Ser. No. 264,254, filed Oct. 28, 1988, now abandoned.

FIELD OF THE INVENTION

This invention relates to an apparatus for covering compartment closures on motor vehicles, and, more particularly, relates to a covering apparatus for protectively and decoratively covering at least a portion of motor vehicle engine compartment hoods.

BACKGROUND OF THE INVENTION

Protective and/or decorative covers for covering exterior surfaces of motor vehicle compartment closures, for example engine compartment hoods, have been heretofore known and/or utilized, with such covers including a pliable cover, made of vinyl material or the like, and various means of securement of the cover on or to the hood.

Such covers heretofore known, however, have not been constructed so that the cover closely conforms to the contours of the vehicle hood and so that a cover of selected dimensions will fit a variety of differently sized and shaped hoods, for example on vehicles of different make, model and/or year of manufacture, such covers heretofore known having been custom fit for each differently shaped and/or sized engine compartment hood and including pockets sewn into the forward portions of the cover for receipt of the front and side edges of the hood and the hood corners described thereby. Such covers have thus not been entirely successful due to the corresponding high costs of manufacturing and stocking a full and continuing line of such covers which attractively fit the vehicle hood, or the like, to be covered. Further improvements in such covers for motor vehicle compartment closures could thus still be utilized.

SUMMARY OF THE INVENTION

This invention provides a covering apparatus which is adaptable for covering at least selected parts of any one of a plurality of similarly positioned, but unlike, motor vehicle compartment closures on different vehicles, for example engine compartment hoods. The apparatus includes a pliable cover and an interconnectable securing structure, with the pliable cover being of preselected dimensions so that, when the cover is positioned on the outwardly facing surface of the closure, portions of the cover extend independently of one another substantially beyond the edges of the closure. Each of the portions of the cover are configured to engage, preferably along the entire length of the outer edge of each portion, the securing structure, for example an interconnectable elastic cord, for biasing the portions of the cover over the edges of the closure and toward the inwardly facing surface of the closure to thus secure the cover to the closure in close conformity with the contours of the outwardly facing surface thereof.

It is therefore an object of this invention to provide a covering apparatus adaptable for covering any one of a plurality of similarly positioned, but unlike, motor vehicle compartment closures on different vehicles.

It is another object of this invention to provide a covering apparatus adaptable for covering at least a part of any one of a plurality of motor vehicle engine compartment hoods on different vehicles.

It is yet another object of this invention to provide a covering apparatus adaptable for covering motor vehicle engine compartment hoods which includes a pliable cover having preselected dimensions selected so that the cover can be utilized to cover at least selected parts of any one of a plurality of such hoods on different vehicles.

It is another object of this invention to provide a covering apparatus for covering at least a part of any one of a plurality of motor vehicle engine compartment hoods on different vehicles which includes a pliable cover positioned over at least a part of an outwardly facing surface of the hood, the cover having portions thereof extending independently of one another substantially beyond each of the edges of the hood when the cover is thus positioned, and a securing structure connectable with the portions of the pliable cover for securing the cover on any one of the hoods so that the portions of the cover are urged around the edges of the hood and positioned adjacent to an inwardly facing surface of the hood when the cover is secured thereon.

It is still another object of this invention to provide a motor vehicle engine compartment hood cover for protectively and decoratively covering at least a portion of a motor vehicle engine compartment hood which includes a pliable cover including a rear portion, forward portion, and first and second forwardly disposed side flap portions, with each of the portions having engaging section positioned thereat, preferably along the entire length of the outer edge of each portion, and wherein an interconnectable biasing portion is engaged with the engaging sections of the cover for biasing the forward portion over at least a part of the front edge of the hood, the rear portion over at least a part of the rear edge of the hood, and the first and second side flap portions over at least a part of the first and second side edges of the hood, respectively, so that the cover is thus maintained on the hood with the pliable cover closely conforming to the contours of the outer surface of the hood.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view showing the closure covering apparatus of this invention mounted on the engine compartment hood of a first vehicle;

FIG. 2 is a perspective view showing the apparatus of FIG. 1 mounted on the hood of a second vehicle and particularly illustrating the adaptability thereof to hoods of different sizes and shapes;

FIG. 3 is a perspective view of the apparatus of FIG. 1 particularly illustrating the vehicle with the hood in a raised position thus showing the structures utilized for securement of the pliable cover portion of the apparatus on the hood of the vehicle and interconnection thereof adjacent to the inwardly facing surface of the hood;

FIG. 4 is a top elevation view of the apparatus of this invention shown detached from the hood of the vehicle;

FIG. 5 is a bottom elevation view of the apparatus as shown in FIG. 4;

FIG. 6 is a sectional view taken through section lines 6—6 of FIG. 4; and

FIG. 7 is a partial bottom elevation view of the interconnection of the elastic cord utilized for securement of the cover portion of the apparatus to the hood of the vehicle.

DESCRIPTION OF THE INVENTION

Motor vehicle compartment closure covering apparatus 15 is shown in FIG. 1 mounted to hood 17 of motor vehicle 19. Motor vehicle 19 includes passenger car 21 adjacent to which hood 17 is hingedly attached for opening of hood 17 to reveal engine compartment 23, defined by front grill work 25, front fenders 27 and 29 and fire walls at the rearward and bottom portions thereof (not shown).

Covering apparatus 15 is shown in FIG. 2 mounted to hood 31 of vehicle 33. As may be appreciated, vehicle 33 is a vehicle having different design characteristics from vehicle 19 and includes hood 31 having both a different size and different shape from that of hood 17. Covering apparatus 15, however, has substantially the same dimensions as cover 15 shown in FIG. 1, the covering being thus adaptable to either hood. As will be more fully set forth hereinafter, covering apparatus 15, having selected dimensions, is adaptable to protectively and decoratively cover a range of hood sizes and designs without modification of the covering apparatus to suit each of the vehicles within the selected size and design range.

As shown in FIGS. 1 through 3, the goal of adapting a cover of specific dimensions to a plurality of hoods of different sizes and shapes is accomplished by providing a substantially planar pliable cover 37, for example made of a fleece or cotton-backed vinyl material, having a forward flap 39, side flaps 41 and 43 and rearward flap 45 which extend beyond hood edges 47, 49, 51 and 53, respectively, of hood 17 (or hood 31 and other hoods within the range of sizes and designs to which cover 15 is adaptable). Flaps 39, 41, 43 and 45 have loops 57 and 59, 61, 63, and 65 and 67 formed at the outer edges thereof, respectively (for example by folding over the fabric and stitching the fabric together to form the loops at the outer portion of the flaps), for receipt of elastic cord 71 therethrough. Loops 57, 59, 61, 63, 65 and 67 are preferably substantially coextensive with the outer edges of cover 37 at forward flap 39, side flaps 41 and 43 and rearward flap 45.

As particularly illustrated in FIG. 3, elastic cord 71, when cover 37 is positioned on the outwardly facing surface of hood 17, is threaded through loops 57, 59, 61, 63, 65 and 67 so that when hooks 73 and 75 are threaded through loops 67 and 65, respectively, the hooks may be interconnected with elastic cord 71 between loops 57 and 59 at the front edge 47 of hood 17. When thus interconnected, elastic cord 71 is stretched to thereby bias flaps 39, 41, 43, and 45 over hood edges 47, 49, 51 and 53, respectively, and adjacent to inwardly facing surface 79 of hood 17, thereby securing cover 37 to the hood of the vehicle without direct connection thereof to the hood. Furthermore, where loops 57, 59, 61, 63, 65 and 67 are substantially coextensive with the edges of cover 37, the cover is urged to a taut fit on the hood equally from substantially the entire perimeter of the cover, rather than from selected points thereat, thus avoiding bulges and/or folds in cover 37 at the outwardly facing surface of hood 17.

Flap 45, between loops 65 and 67, and flap 39, between loops 57 and 59, are configured to form notches 81 and 83 therein, respectively, to accommodate threading and interconnection of elastic cord 71 so that cord 71 when interconnected will bias pliable cover 37 over the outer surface of hood 17 consistently tautly over the surface to attractively accommodate different design characteristics present in different vehicle hoods (for example where such hoods have either a straight or angled front edge 47 and/or rear edge 53). Notch 83 also accommodates operation of latch 85 at the inwardly facing surface 79 of hood 17, latch 85 being releasably matable with latch receiving structure 87 for maintaining hood 17 in a closed position.

Turning now to FIGS. 4 and 5, where covering apparatus 15 is shown detached from the vehicle, covering apparatus 15 as shown herein employs a tee-shaped design for partially covering the hood at central portions thereof approaching the passenger cab, while more fully covering the forwardmost portion of the hood (it being understood that a variety of designs could be utilized including a cover designed for substantially complete coverage of the hood). Covering apparatus 15 includes protective bindings 91 sewn over the exposed edges of pliable cover 37 (i.e., where the cover is not stitched to form loops 57, 59, 61, 63, 65 and 67). Protective bindings 91 may be, for example, a felt or vinyl material stitched over the outer edges of cover 37.

By selectively manufacturing covering apparatus 15 with selected dimensions along its overall width described by dimension line A and its overall length described by dimension line B, the cover will fit a variety of differently sized engine compartment hoods within a range limited only by a minimum hood width (described by dimension line C), maximum hood width (described by dimension line D), minimum hood length (described by dimension line E) and maximum hood length (described by dimension line F).

For example, a covering apparatus having overall dimensions A and B of 59½ inches×51 inches, respectively, will fit a plurality of vehicles having hoods ranging in width from 50 to 55½ inches and in length from 36 to 43 inches (vehicles falling within this range include mini-trucks and four-wheel drive vehicles as follows: Jeep Comanche pickup 1986 to 1988 model years; Jeep Cherokee/Wagoneer Downsized, model years 1984 to 1988; Chevrolet S10 Blazer, model years 1983 to 1988 and S10 Pickup, model years 1982 to 1988; Datsun/Nissan Hardbody Pickups and Pathfinders, model years 1986½ to 1988; Dodge D-50 Pickup and Raider, model years 1987 and 1988; Ford Bronco II, model years 1984 to 1988, and Ranger Pickups, model years 1983 to 1988; GMC S-15 Jimmy, model years 1983 to 1988, and S-15 Pickups, model years 1982 to 1988; Isuzu Pickup, model years 1986 to 1988, and Trooper, model years 1984 to 1988; Mazda Pickup and B-2000, model years 1986 to 1988; Mitsubishi Pickup, model years 1987 and 1988, and Montero, model years 1984 to 1988; and Toyota Pickup and 4-Runner, model years 1984 to 1988).

By way of further example, full size Chevrolet, Ford and Dodge pickups and four-wheel drive vehicles have engine compartment hoods having a width ranging from 63½ inches to 84 inches and a length ranging from 43 inches to 55 inches, all of which could utilize a closure covering apparatus as described herein having overall dimensions A and B of 88 inches by 63 inches, respectively. Mini-vans of the same make have a hood width ranging from 58½ inches to 63 inches and length ranging from 22 inches to 33 inches, and could utilize the covering apparatus shown herein having overall dimensions A and B of 67 inches by 41 inches, respectively. Full size vans of the same make, having hood widths ranging from 62 inches to 69 inches and hood lengths ranging from 14 inches to 24 inches, could utilize a closure covering apparatus as described herein having overall dimensions A and B of 73 inches by 32 inches, respectively. It is apparent, of course, that the length of cord 71 will necessarily correspond to the dimensions selected for apparatus 15 so that proper tension is maintained when the cover is mounted to hoods within the various size ranges.

FIG. 6 is a sectional view of loop 61 in side flap 41 of cover 37 having cord 71 positioned therethrough (the structure illustrated being substantially the same as loops 57, 59, 63, 65 and 67), and particularly illustrating stitching 109 through cover portion 37 to thus form loop 61 for receipt of cord 71 therethrough. FIG. 7 is a detailed illustration of the interconnection of cord 71 as shown in FIG. 3 and of the method of attachment of hooks 75 and 73 to cord 71 through loops 111 and 113, respectively, formed by clamps 115 and 117, respectively.

As may be appreciated from the foregoing, a motor vehicle compartment closure covering apparatus is shown for decoratively and protectively covering motor vehicle compartment closures, for example engine compartment hoods (it being understood that the closure covering could be adapted for use on trunk lids, passenger doors, and the like) wherein the apparatus is adaptable for covering any one of a plurality of similarly positioned, but unlike, motor vehicle compartment closures on different vehicles, for example on vehicles having a different source of manufacture, or of different design and/or model year.

What is claimed is:

1. A covering apparatus adaptable for covering any one of a plurality of similarly positioned motor vehicle compartment closures on different vehicles wherein each of said similarly positioned closures on said different vehicles are movable for access to a compartment and have a front edge, a rear edge, first and second spaced side edges and inwardly and outwardly facing surfaces, said closures on said different vehicles having different widths between said spaced side edges thereof, said widths varying in a range of at least about four inches, said covering apparatus comprising:

integrally formed pliable cover means having a forward portion and first and second spaced side portions, each of said portions having an outer edge with a selected overall length, said length of said outer edge of said forward portion being substantially the same as said width between said spaced wide edges of a narrowest one of said closures on said different vehicles upon which said cover is utilized, said outer edges of said side portions being spaced apart a distance greater than said width between said spaced side edges of a widest one of said closures on said different vehicles upon which said cover is utilized so that said cover means will cover at least selected parts of said any one of said plurality of similarly positioned motor vehicle compartment closures on said different vehicles having said different widths; and securing means engagable with said cover means for releasably securing said cover means on said compartment closures by biasing said portions of said cover means around different selected ones of said edges and adjacent to said inwardly facing surface of said closure so that closure accessibility for normal movement thereof and thus access to said compartment is maintained while said cover means is fully secured on said closure and without requirement for manipulation of said apparatus to allow closure movement.

2. The apparatus of claim 1 wherein engaging means are formed at said outer edges for receipt of said securing means to thus bias said edge portions in a plurality of different directions, said engaging means formed at said outer edges of said side portions being spaced from said engaging means formed at said forward portion.

3. The apparatus of claim 2 wherein said forward portion and side portions of said cover means define a plurality of independently biasable flaps, each of said flaps being biasable over a different selected one of said edges of said compartment closure and toward said inwardly facing surface thereof by said securing means.

4. The apparatus of claim 2 wherein said securing means includes an interconnectable elastic cord receivable by said engaging means.

5. The apparatus of claim 1 wherein said cover means is a substantially planar cover.

6. The apparatus of claim 1 wherein said compartment closures are engine compartment hoods each having forward parts and central parts extending rearwardly from said forward parts, and wherein said pliable cover means is configured for covering only said forward and central parts of said hoods.

7. A covering apparatus for covering a part of any one of a plurality of motor vehicle engine compartment hoods on different vehicles wherein said engine compartment hoods on said different vehicles have at least one of different widths and different lengths, said hoods having inwardly and outwardly facing surfaces, a rear edge and a front edge defining said hood length therebetween, and first and second side spaced edges defining said hood width therebetween, said widths of said hoods on said different vehicles varying in a range of at least about four inches and length of said hoods on said different vehicles varying in a range of at least about seven inches, said covering apparatus comprising:

pliable cover means having a rear portion, a forward portion, and first and second spaced side portions, each of said portions having an outer edge with a selected overall length, said length of said outer edge of said forward portion being substantially the same as said width between said spaced side edges of a narrowest one of said hoods, said outer edges of said side portions being spaced apart a distance greater than said width between said spaced side edges of a widest one of said hoods so that said cover means will cover said part of said any one of a plurality of motor vehicle engine compartment hoods on different vehicles having said different widths and different lengths, said cover means being positionable over said outwardly facing surface of said any one of a plurality of motor vehicle engine compartment hoods so that at least a part of each of said portions thereof extends beyond different ones of said edges of said any one of said hoods when said cover is thus positioned; and securing means connectable with said portions of said pliable cover means for securing said cover means on said any one of said hoods so that said parts of each of said portions are urged around said different ones of said edges and positioned adjacent to said inwardly facing surface of said any one of a plurality of motor vehicle engine compartment hoods when said cover means is secured thereon thereby maintaining hood accessibility for normal movement thereof without requirement for manipulation of said apparatus.

8. The covering apparatus of claim 7 wherein said portions of said cover means comprise a forward flap, a rearward flap, and first and second side flaps, said flaps not being directly connected to each other at said outer edges thereof, said forward flap being urged over said front edge of said hood by said securing means, said rearward flap being urged over said rear edge of said hood by said securing means, and said first and second side flaps being urged over said first and second side edges of said hood, respectively, by said securing means.

9. The covering apparatus of claim 7 wherein loops are formed at said outer edge of each of said portions with said loop at said outer edge of each said portion being spaced from said loops at said outer edges of all other said portions, and wherein said securing means includes an elastic cord threadable through said loops.

10. The covering apparatus of claim 7 wherein said securing means includes an elastic cord having a central section and first and second ends, and wherein said central section and said first and second ends are interconnectable for securing said cover means on said compartment hoods.

11. The covering apparatus of claim 7 wherein said pliable cover means is substantially planar and is constructed of a fleece backed vinyl material.

12. The covering apparatus of claim 11 wherein said pliable cover means is of a tee-shaped construction for covering forward and central portions of motor vehicle engine compartment hoods.

13. The covering apparatus of claim 7 wherein said forward and rear portions of said cover means each include a plurality of flap sections.

14. A motor vehicle engine compartment hood covering apparatus for protectively and decoratively covering at least a portion of any one of a plurality of unlike motor vehicle engine compartment hoods on different vehicles, said motor vehicles having a passenger cab and said hoods having contours and a rear edge adjacent to said cab, a front edge and side edges extending between said rear and front edges thereof, said front edges of said hoods on different vehicles having different lengths varying in a range of at least about four inches between the shortest and longest of said lengths, said covering apparatus comprising:

an integrally formed pliable cover including a rear portion, a forward portion having a forwardmost edge having an overall length substantially the same as the shortest of said different lengths of said front edges of said hoods on different vehicles, and first and second side flap portions, said side flap portions being adjacent to said forward portion rearward of said forwardmost edge thereof, said portions each having engaging means positioned thereat with said engaging means at said first side flap portion being spaced from said engaging means at said second side flap portion a distance greater than said overall length of said forwardmost edge of said forward portion and greater than the longest of said different lengths of said front edges of said hoods on different vehicles; and interconnectable biasing means engagable with said engaging means of said portions of said cover for biasing said forward portion over at least part of said front edge of said hood, said rear portion over at least part of said rear edge of said hood and said first and second side flap portions over at least part of said first and second side edges of said hood, respectively, and, when interconnected, maintaining said cover on said hood so that pliable cover closely conforms to said contours of said hood and allows normal movement of said hood without requiring separate manipulation of any part of said apparatus.

15. The engine compartment hood covering apparatus of claim 14 wherein said forward portion of said pliable cover includes first and second flap sections having a material indentation therebetween, and wherein said motor vehicle includes a latching apparatus centrally positioned adjacent to said front edge of said engine compartment hood, wherein said latch extends between said material indentation between said flaps of said forward portions of said cover when said cover is maintained on said hood.

16. The engine compartment hood covering apparatus of claim 15 wherein said interconnectable biasing means is a length of elastic cord having a central section and first and second ends, said first and second ends being connectable with said central section between said first and second flap sections of said forward portion of said cover for maintaining said cover on said hood.

17. The engine compartment hood covering apparatus of claim 14 wherein said interconnectable biasing means is a substantially continuous elastic cord, and wherein said engaging means of said portions of said cover are substantially continuous loops positioned along an outer edge of each of said portions, and wherein said elastic cord is threadable through said loops.

18. The engine compartment hood covering apparatus of claim 17 wherein said elastic cord includes connecting means at opposite ends thereof for interconnection of said cord, so that when interconnected each of said portions of said cover are biased toward an inwardly facing part of said hood.

19. The engine compartment hood covering apparatus of claim 14 wherein said pliable cover is made of a fleece backed vinyl material.

* * * * *